(12) United States Patent
Tsurumi et al.

(10) Patent No.: US 8,903,123 B2
(45) Date of Patent: Dec. 2, 2014

(54) IMAGE PROCESSING DEVICE AND IMAGE PROCESSING METHOD FOR PROCESSING AN IMAGE

(75) Inventors: Shingo Tsurumi, Saitama (JP); Yun Sun, Tokyo (JP); Tomohiko Gotoh, Kanagawa (JP)

(73) Assignee: Sony Corporation, Tokyo (JP)

( * ) Notice: Subject to any disclaimer, the term of this patent is extended or adjusted under 35 U.S.C. 154(b) by 986 days.

(21) Appl. No.: 12/954,212

(22) Filed: Nov. 24, 2010

(65) Prior Publication Data

US 2011/0135153 A1 Jun. 9, 2011

(30) Foreign Application Priority Data

Dec. 4, 2009 (JP) ................ P2009-277074

(51) Int. Cl.
*G06K 9/00* (2006.01)
*G06T 7/20* (2006.01)

(52) U.S. Cl.
CPC .......... *G06K 9/00295* (2013.01); *G06T 7/2033* (2013.01); *G06T 2207/30201* (2013.01)
USPC ........... 382/103; 382/118; 382/165; 382/195; 348/169

(58) Field of Classification Search
CPC ....... G06K 9/00295; G06K 9/00; G06K 9/46; G06T 2207/30201; G06T 2207/30196; G06T 7/2033
USPC ................. 382/103, 107, 115–118, 165–172, 382/190–208; 348/14.1, 49, 169; 340/5.52–5.54, 5.82–5.84
See application file for complete search history.

(56) References Cited

U.S. PATENT DOCUMENTS

| | | | | |
|---|---|---|---|---|
| 7,266,225 B2 * | 9/2007 | Mariani et al. | ................ | 382/118 |
| 7,433,495 B2 * | 10/2008 | Rui et al. | ................ | 382/103 |
| 7,734,067 B2 * | 6/2010 | Kim et al. | ................ | 382/115 |
| 7,787,665 B2 * | 8/2010 | Nakashima | ................ | 382/118 |
| 7,889,892 B2 * | 2/2011 | Terakawa | ................ | 382/118 |
| 7,894,637 B2 * | 2/2011 | Noguchi et al. | ................ | 382/118 |
| 8,098,885 B2 * | 1/2012 | Zhang et al. | ................ | 382/103 |
| 8,238,617 B2 * | 8/2012 | Omoto et al. | ................ | 382/118 |
| 8,306,271 B2 * | 11/2012 | Yoda et al. | ................ | 382/104 |
| 8,548,230 B2 * | 10/2013 | Kameyama | ................ | 382/155 |
| 8,565,518 B2 * | 10/2013 | Kameyama | ................ | 382/155 |
| 8,594,373 B2 * | 11/2013 | Sturzel et al. | ................ | 382/103 |
| 8,605,995 B2 * | 12/2013 | Kameyama | ................ | 382/155 |
| 8,615,383 B2 * | 12/2013 | Dobbins et al. | ................ | 703/1 |

(Continued)

FOREIGN PATENT DOCUMENTS

| | | |
|---|---|---|
| JP | 2006-254174 | 9/2006 |
| JP | 2009-048489 | 3/2009 |

*Primary Examiner* — Chan Park
*Assistant Examiner* — Mia M Thomas
(74) *Attorney, Agent, or Firm* — Finnegan, Henderson, Farabow, Garrett & Dunner, LLP

(57) ABSTRACT

An image processing device includes a facial region extraction unit extracting a facial region, an identification information acquisition unit acquiring identification information for identifying a face in the facial region, and first and second integrated processing units performing integrated processing. The first and second integrated processing units determine a threshold value on the basis of a relationship between an estimated area and a position of the face being tracked, calculate a similarity between a face being tracked and a face pictured in an image to be stored in a predetermined storage period, and determine if the face being tracked and the stored face image are the face of the same person.

15 Claims, 11 Drawing Sheets

(56) References Cited

U.S. PATENT DOCUMENTS

| | | |
|---|---|---|
| 2001/0031072 A1* | 10/2001 | Dobashi et al. ............... 382/118 |
| 2003/0123728 A1* | 7/2003 | Dimitrova et al. ............ 382/173 |
| 2003/0174869 A1* | 9/2003 | Suarez .......................... 382/118 |
| 2003/0198368 A1* | 10/2003 | Kee ............................... 382/118 |
| 2004/0062423 A1* | 4/2004 | Doi ............................... 382/118 |
| 2005/0041114 A1* | 2/2005 | Kagaya ...................... 348/222.1 |
| 2005/0094849 A1* | 5/2005 | Sung et al. ................... 382/103 |
| 2005/0149229 A1* | 7/2005 | Doi et al. ....................... 700/245 |
| 2007/0019081 A1* | 1/2007 | Nakashima ............. 348/231.99 |
| 2008/0037840 A1* | 2/2008 | Steinberg et al. ............. 382/118 |
| 2008/0181508 A1* | 7/2008 | Kaneda et al. ................ 382/190 |
| 2009/0217315 A1* | 8/2009 | Malik et al. ....................... 725/9 |
| 2011/0142286 A1* | 6/2011 | Morriyama ................... 382/103 |
| 2011/0311112 A1* | 12/2011 | Matsuyama et al. .......... 382/118 |
| 2012/0038750 A1* | 2/2012 | Lim ................................. 348/49 |
| 2012/0054690 A1* | 3/2012 | Lim ............................... 715/852 |
| 2013/0004025 A1* | 1/2013 | Muninder ..................... 382/107 |
| 2013/0216109 A1* | 8/2013 | Ishikawa et al. .............. 382/118 |
| 2014/0086450 A1* | 3/2014 | Huang et al. .................. 382/103 |
| 2014/0133758 A1* | 5/2014 | Kienzle .......................... 382/195 |

* cited by examiner

FIG. 2
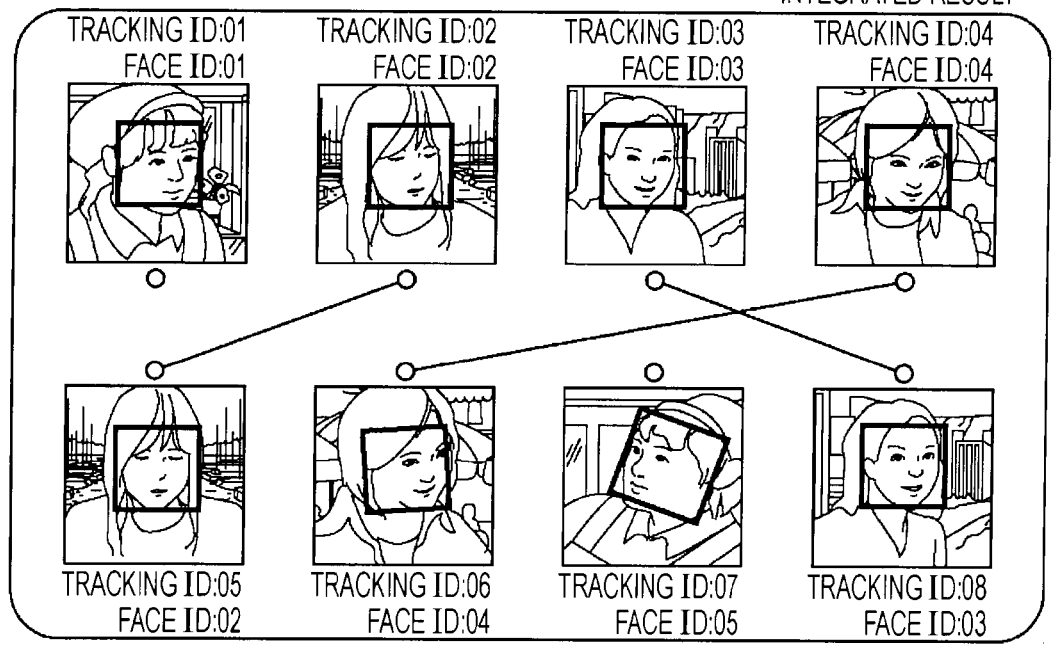

FIG. 5

| FACE ASPECT (Yaw) | FEATURES | | | | |
|---|---|---|---|---|---|
| | TO -22.5 | -22.5 TO -7.5 | -7.5 TO 7.5 | 7.5 TO 22.5 | FROM 22.5 |
| EXPRESSION SMILING FACE | | | | | |
| NON-SMILING FACE | | | | | |

FIG. 6
TRACKING ID:01 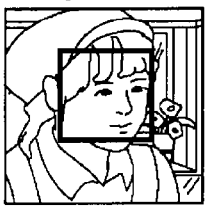
TRACKING ID:02 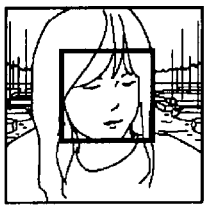
TRACKING ID:03 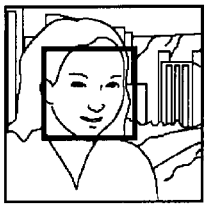
TRACKING ID:04 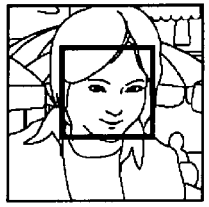
⬇ SEPARATING THE BACKGROUD AND FACIAL REGION
TRACKING ID:01 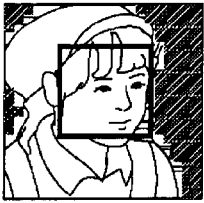
TRACKING ID:02 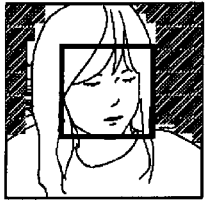
TRACKING ID:03 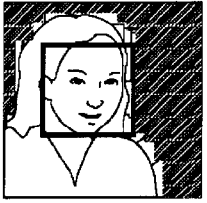
TRACKING ID:04 
⬇ SETTING AN AREA EXTRACTING A COLOR HISTOGRAM
TRACKING ID:01 
TRACKING ID:02 
TRACKING ID:03 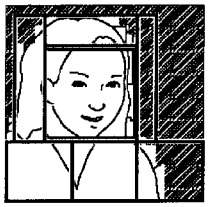
TRACKING ID:04 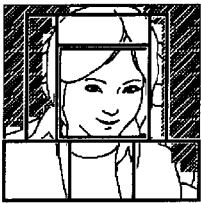

FIG. 11

| | TARGET NUMBER (RECOGNITION RESULT) | TARGET NUMBER (LABELING RESULT) | IDEAL NUMBER | FACTOR RATIO | CONFORMITY (Recog/Label) | REPRODUCIBILITY | F VALUE |
|---|---|---|---|---|---|---|---|
| BEFORE PROCESSING | 522 | 255 | 245 | 2.04 | 0.47 | 0.96 | 0.63 |
| AFTER PROCESSING | 283 | 255 | 227 | 1.12 | 0.80 | 0.89 | 0.84 |

IMAGE PROCESSING DEVICE AND IMAGE PROCESSING METHOD FOR PROCESSING AN IMAGE

BACKGROUND OF THE INVENTION

1. Field of the Invention

The present invention relates to an image processing device, an image processing method and a program, especially the image processing device, the image processing method and the program capable of processing an image processing result according to the purpose of use.

2. Description of the Related Art

In the related art, a digital signage system displaying a video commercial on a display includes a capturing device for capturing a face of a person who is viewing a display, and processes the image on which the face of the person pictured on the image captured by the capturing device is being tracked. Furthermore, based on the image processing result, the digital signage system can calculate a breakdown of viewers (the proportion of males to females or by age bracket) and adjust the contents of a video commercial based on the result of the image processing, or calculate the effects of a commercial by counting the number of viewers per day.

However, when a face being tracked faces to the side with respect to display, in the digital signage system it is difficult to recognize the face, and the tracking is terminated (losing the face). Then, if the same person starts viewing the display, the face is detected as a new face and the tracking resumes. Therefore, the digital signage system counts the same person twice, thereby, the reliability of the calculated result of the commercial effect degrades.

For instance, in Japanese Unexamined Patent Application Publication No. 2006-254274, an analyzing apparatus is disclosed which can calculate a highly reliable viewer rating enabling a determination of the effectiveness of a video commercial by comparing the face information and determining if it is that of the same person. Also, in Japanese Unexamined Patent Application Publication No. 2009-48489, the image processing apparatus capable of determining if a face is that of the same person at a high speed and constant accuracy is disclosed.

Thus, the digital signage system can determine if a face is that of the same person, thereby counting the same person more than once can be avoided.

SUMMARY OF THE INVENTION

However, in the digital signage system, when adjusting the content of the video commercial based on the calculated breakdown of viewers, a high speed determination of if a face is a face of the same person is necessary for the image processing, and when calculating an effect of a commercial, it is desired to process an image in a manner of increasing determination reliability. Similarly, the image processing necessary to be in the digital signage system may be different according to purpose of use of the image processing result and should be flexible enough for the corresponding purpose.

The present invention is for resolving this situation and is adaptive enough for processing an image processing result according to purpose of use.

An image processing device of the first embodiment of the present invention includes a facial region extraction unit configured to extract a facial region including a face, after detecting the face pictured in an image, an identification information acquisition unit configured to acquire identification information for identifying a face in the facial region extracted by the facial region extraction unit, a first integrated processing unit configured to perform integrated processing by determining if a face being tracked and a face pictured in an image to be stored in a predetermined storage period after vanishing from the image are the face of the same person based on the identification information, and a second integrated processing unit configured to perform integrated processing by determining if a face being tracked and a face pictured in an image to be stored in a predetermined storage period after vanishing from the image are the face of the same person based on the identification information in a different manner from that of the first integrated processing unit, wherein the first integrated processing unit determines a threshold value on the basis of the relationship between an estimated area in which the face pictured in the image to be stored in the predetermined storage period after vanishing from the image (hereinafter also referred to as only the "stored face image") is predicted to appear and a position of the face being tracked, calculates a similarity between the face being tracked and the stored face image, and determines if the face being tracked and the stored face image are the face of the same person based on the calculated similarity, and the threshold value corresponding to the stored face image used in calculating the similarity, and the second integrated processing unit calculates a similarity between the face being tracked and the stored face image with a plurality of face directions, and determines if the face being tracked and the stored face image are the face of the same person based on the calculated similarity for the plurality of face directions.

An image processing method or program of the first embodiment of the present invention includes the steps of extracting a facial region including a face, after detecting the face pictured in an image, acquiring identification information for identifying a face in the extracted facial region, performing a first integrated processing by determining if a face being tracked and a face pictured in an image to be stored in a predetermined storage period after vanishing from the image are the face of the same person based on the identification information, and performing a second integrated processing by determining if a face being tracked and a face pictured in an image to be stored in a predetermined storage period after vanishing from the image are the face of the same person based on the identification information in a different manner from that of the first integrated processing means, wherein the first integrated processing determines a threshold value on the basis of a relationship between an estimated area in which the stored face image is predicted to appear and a position of the face being tracked, calculates a similarity between a face being tracked and a stored face image, and determines if the face being tracked and a stored face image are the face of the same person based on the calculated similarity, and the threshold value corresponding to the stored face image used in calculating the similarity, and the second integrated processing calculates a similarity between the face being tracked and the stored face image for a plurality of face directions, and determines if the face being tracked and the stored face image are the face of the same person based on the calculated similarities for the plurality of face directions.

In the first embodiment of the present invention, a facial region including a face after detecting the face pictured in an image is extracted, identification information for identifying the face in the extracted facial region is acquired, a first integrated processing by determining if a face being tracked and a face pictured in an image to be stored in a predetermined storage period after vanishing from the image are the face of the same person based on the identification information is performed, and a second integrated processing by determining if a face being tracked and a face pictured in an image to be stored in a predetermined storage period after vanishing from the image are the face of the same person based on the identification information in a different manner from that of the first integrated processing is performed, wherein the first integrated processing determines a threshold value on the basis of a relationship between an estimated area in which the stored face image is predicted to appear and a position of the face being tracked, calculates a similarity between the face being tracked and the stored face image, and determines if the face being tracked and the stored face image are the face of the same person based on the calculated similarity, and the threshold value corresponding to the stored face image used in calculating the similarity, and the second integrated processing calculates a similarity between the face being tracked and the stored face image for a plurality of face directions, and determines if the face being tracked and the stored face image are the face of the same person based on the calculated similarities for the plurality of the face directions.

An image processing device of the second embodiment of the present invention includes a facial region extraction unit configured to extract a facial region including a face, after detecting the face pictured in an image, an identification information acquisition unit configured to acquire identification information for identifying a face in the facial region extracted by the facial region extraction unit, and an integrated processing unit configured to perform integrated processing by determining if a face being tracked and a face pictured in an image to be stored in a predetermined storage period after vanishing from the image are the face of the same person based on the identification information, wherein the integrated processing unit determines a threshold value on the basis of the relationship between an estimated area in which the stored face image is predicted to appear and a position of the face being tracked, calculates a similarity between the face being tracked and the stored face image, and determines if the face being tracked and the stored face image are the face of the same person based on the calculated similarity, and a threshold value corresponding to the stored face image used in calculating the similarity.

An image processing method or program of the second embodiment of the present invention includes the steps of extracting a facial region including a face after detecting the face pictured on the image, acquiring identification information for identifying a face in the extracted facial region, and performing an integrated processing by determining if a face being tracked and a face pictured in an image to be stored in a predetermined storage period after vanishing from the image are the face of the same person based on the identification information, wherein the integrated processing determines a threshold value on the basis of the relationship between an estimated area in which the stored face image is predicted to appear and a position of the face being tracked, calculates a similarity between a face being tracked and a stored face image, and determines if the face being tracked and the stored face image are the face of the same person based on the calculated similarity, and the threshold value corresponding to the stored face image used in calculating the similarity.

In the second embodiment of the present invention, a facial region including a face after detecting the face pictured in an image is extracted, identification information for identifying the face in the extracted facial region is acquired, and an integrated processing by determining if a face being tracked and a face pictured in an image to be stored in a predetermined storage period after vanishing from the image are the face of the same person based on the identification information is performed, wherein an integrated processing determines a threshold value on the basis of a relationship between an estimated area in which the stored face image is predicted to appear and a position of the face being tracked, calculates a similarity between the face being tracked and the stored face image, and determines if the face being tracked and the stored face image are the face of the same person based on the calculated similarity, and the threshold value corresponding to the stored face image used in calculating the similarity.

An image processing device of the third embodiment of the present invention includes a facial region extraction unit configured to extract a facial region including a face, after detecting the face pictured in an image, an identification information acquisition unit configured to acquire identification information for identifying a face in the facial region extracted by the facial region extraction unit, and an integrated processing unit configured to perform integrated processing by determining if a face being tracked and a face pictured in an image to be stored in a predetermined storage period after vanishing from the image are the face of the same person based on the identification information, wherein the integrated processing unit calculates a similarity between the face being tracked and the stored face image for a plurality of face directions, and determines if the face being tracked and the stored face image are the face of the same person based on the calculated similarities for the plurality of the face directions.

An image processing method or program of the third embodiment of the present invention includes the steps of extracting a facial region including a face after detecting the face pictured on the image, acquiring identification information for identifying a face in the extracted facial region, and performing an integrated processing by determining if a face being tracked and a face pictured in an image to be stored in a predetermined storage period after vanishing from the image are the face of the same person based on the identification information, wherein the integrated processing calculates a similarity between a face being tracked and a stored face image for a plurality of face directions, and determines if the face being tracked and the stored face image are the face of the same person based on the calculated similarities for the plurality of the face directions.

In the third embodiment of the present invention, a facial region including a face, after detecting a face pictured in an image is extracted, identification information for identifying the face in the extracted facial region is acquired, and an integrated processing by determining if a face being tracked and a face pictured in an image to be stored in a predetermined storage period after vanishing from the image are the face of the same person based on the identification information is performed, wherein the integrated processing calculates a similarity between a face being tracked and a stored face image for a plurality of face directions, and determines if the face being tracked and the stored face image are the face of the same person based on the calculated similarities for the plurality of the face directions.

It is possible to process the image processing result depending on the use of purpose according to any one of the first to three embodiments of the present invention.

BRIEF DESCRIPTION OF THE DRAWINGS

FIG. 2 is a drawing illustrating an integrated processing result;

FIG. 5 is a drawing illustrating the organization of the features of the extracted face;

FIG. 6 is a drawing illustrating the calculating process for calculating a plurality of histograms for a plurality of area in the facial periphery area;

FIG. 11 is a drawing illustrating an effect of the second integrated processing.

DESCRIPTION OF THE PREFERRED EMBODIMENTS

Hereinafter, the embodiments of the invention will be described by referring to the figures in detail.

Figure 1:
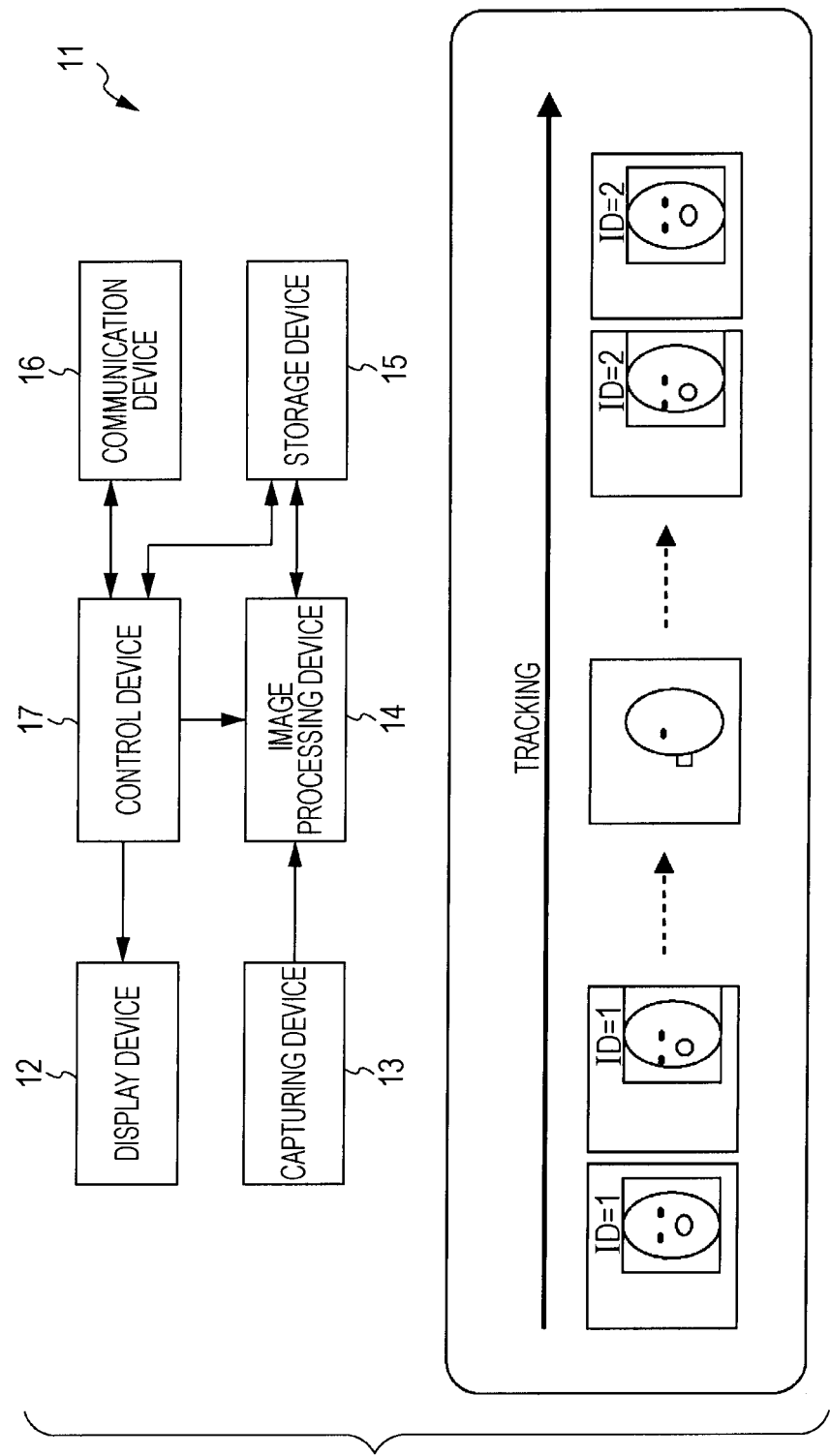
FIG. 1 is a block diagram showing the configuration of one example of the digital signage system according to an embodiment of the present invention.

FIG. 1 is a block diagram showing the configuration of one example of the digital signage system according to an embodiment of the present invention. Also, in the present specification, a system means an entire apparatus configured with a plurality of devices.

In FIG. 1, the digital signage system 11 includes a display device 12, a capturing device 13, an image processing device 14, a storage device 15, a communication device 16 and a control device 17.

The display device 12 can be a LCD (Liquid Crystal Display) or an organic EL (Electro Luminescence), and displays a video commercial which can be a variety of images or text information according to the control of the control device 17.

The capturing device 13 includes an optical system which can be a lens and an aperture, and a capturing unit which can be CCD (Charge Coupled Device) or CMOS (Complementary Metal-Oxide Semiconductor) sensor. The capturing device 13 captures a moving picture of an optical subject imaged on a light sensing portion of a capturing unit in a predetermined frame rate by the optical system, and provides image data from which results can be acquired, to the image processing device 14.

The image processing device 14 includes a circuit board having a plurality of electronic components or a system IC (Integrated Circuit). The image processing device 14 tracks an image (a freeze frame) of the respective frames of a moving picture captured by the capturing device 13 in sequence by recognizing a face pictured in an image as a processing objective.

For example, the image processing device 14 tracks a face by recognizing a face pictured in an image based on a facial feature such as an eye, nose, and mouth, and assigning the same ID (Identification) to the face of the same person. However, in the case in which a part of the face in an image captured in the capturing device 13 is hidden, it is difficult to recognize the face. For instance, as shown in the lower side of FIG. 1, if a face (ID=1) being tracked faces sideward, the face is recognized and disappears (the face vanishes). Then, when the face of the same person faces ahead, a new ID (ID=2) as a newly detected face is assigned by the image processing device 14.

Therefore, in order to avoid processing the face of the same person as a newly detected face when the face is temporarily vanished, the image processing device 14 performs an integrated processing of the temporarily vanished face during the vanishing time, which will be described. Additionally, other examples of a face vanishing temporarily without be recognized besides a face facing sideward are crossing of an object between the capturing device 13 and a face, moving of a person to a position behind an obstacle such as a tree to the capturing device 13 or a person moving out of the capturing range of the capturing device 13.

The storage device 15 is configured to have a hard disk or a non-volatile memory and stores a database in which a variety of information pertaining to a face recognized by the image processing device 14 is registered. Furthermore, the storage device 15 stores image, text information, and the like displayed on the display device 12.

The communication device 16 includes network interface and provides instructions received from a user, through any network such as the internet. Also, the communication device 16 transmits a database stored on the storage device 15 to a user device through a network, according to the control of the control device 17.

The control device 17 controls the devices of the digital signage system 11. For example, control device 17 controls the integrated processing performed in the image processing device 14, according to instructions from a user received through the communication device 16. Additionally, the control device 17 modifies a video commercial displaying on the display device 12, according to the breakdown of viewers specified by the information accumulated in the storage device 15.

Next, referring to FIG. 2, the results of the integrated processing performed in the image processing device 14 is described.

In the upper side of FIG. 2, eight IDs of assigned faces (tracking ID=01 to 08) in the image processing device 14 are shown as a tracking result from an image captured by the capturing device 13. The image processing device 14 performs integrated processing for these faces, and then it is assumed it determines that the face of the tracking ID=02 is the same person of the face of the tracking ID=05. Like this, it determines that the face of the tracking ID=03 is the same person of the face of the tracking ID=08, and the face of the tracking ID=04 is the same person of the face of the tracking ID=06.

In this case, for example, an integrated result can be obtained as shown on the lower side of FIG. 2, and the image processing device 14 assigns a face ID=02 to the face of the tracking ID=02 and the face of the tracking ID=05, a face ID=03 to the face of the tracking ID=03 and the face of the tracking ID=08, and a face ID=04 to the face of the tracking ID=04 and the face of the tracking ID=06.

Therefore, the information for the faces of the same face ID is integrated as the face of the same person. Also, the face of the tracking ID=01 and the face of the tracking ID=07 which are not determined to be the same person are assigned with the tracking ID=01 and the tracking ID=05, respectively.

In the image processing device 14, a face region (an area in a rectangle in the respective images of FIG. 2) which is an area in which a face is pictured in an image captured by the capturing device 13 is recognized, and it is decided if the faces are those of the same person based on facial similarity. In addition, the image processing device 14 uses the features of the facial periphery area in the enlarged facial region (for example, in the respective images of FIG. 2, an area including the area around the face including the head, shoulders and chest) in which a certain area other than an entire facial region is enlarged to determine if a face is that of the same person.

Furthermore, even if the face is that of the same person, the features may be different depending on the face directions, so the image processing device 14 determines if a face is that of the same person based on the similarities among the faces corresponding to the face angles by accumulating captured images of the face being tracked with a plurality of directions.

Figure 3:
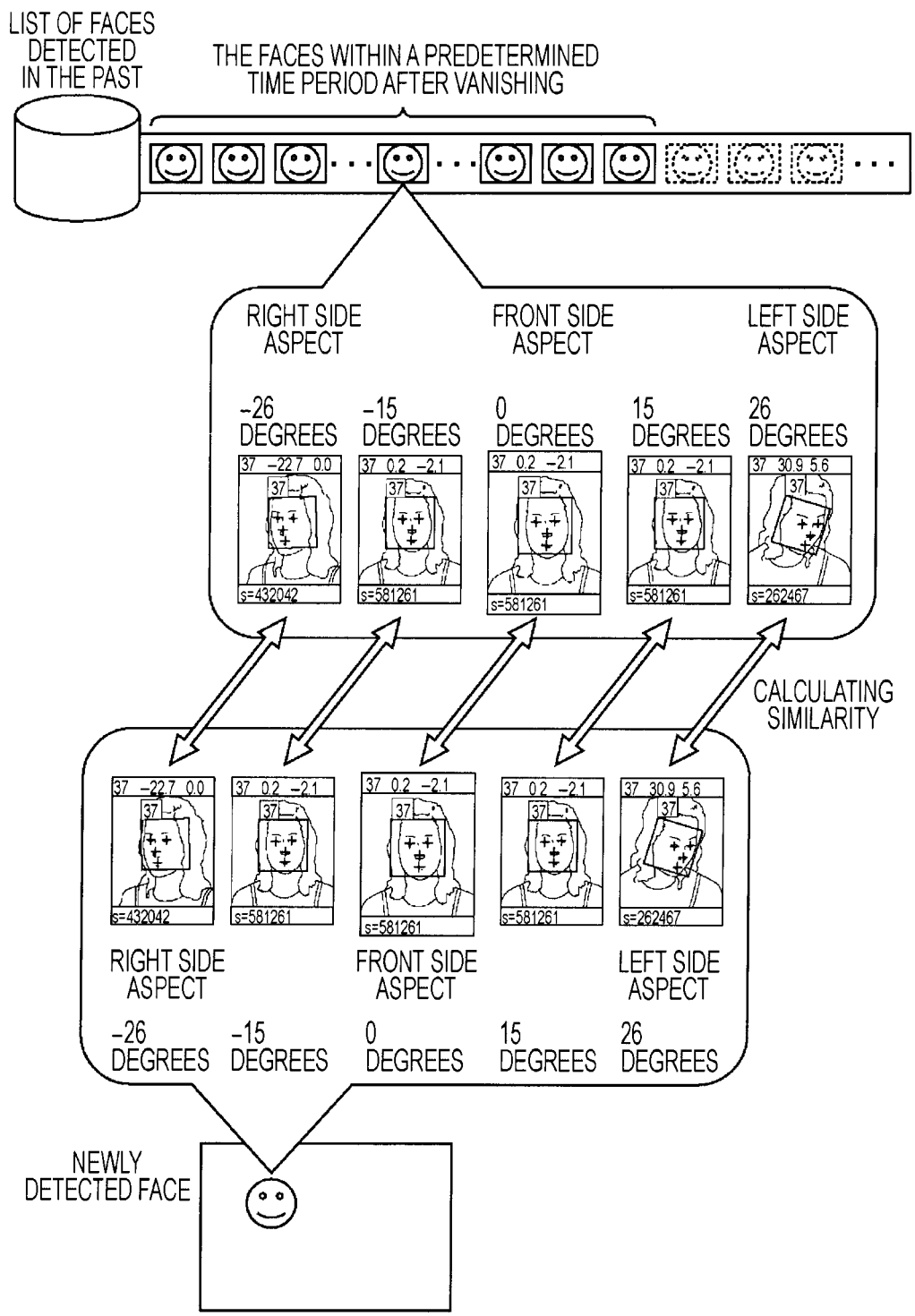
FIG. 3 is a drawing illustrating a similarity calculation process for each face angle.

That is, as shown in FIG. 3, for example, the image processing device 14 stores in the storage device 15 (see FIG. 1) registered image data including faces pictured in a predetermined storage period after their vanishing, and when a new face is detected, determines at a predetermined time if the same face as the new face is among the faces within the predetermined storage period after vanishing by matching the newly detected face with the faces registered in the list.

In this case, the image processing device 14 holds the captured face images with five face angles (+/−26 degree, +/−15 degree, 0 degree), and the face images with these face angles are registered in the list of the storage device 15. The image processing device 14 also calculates the similarity for the faces with the same face angles using a newly detected face and the faces registered in the list, for example, using an average value of these similarities to determine if a face is that of the same person.

Figure 4:
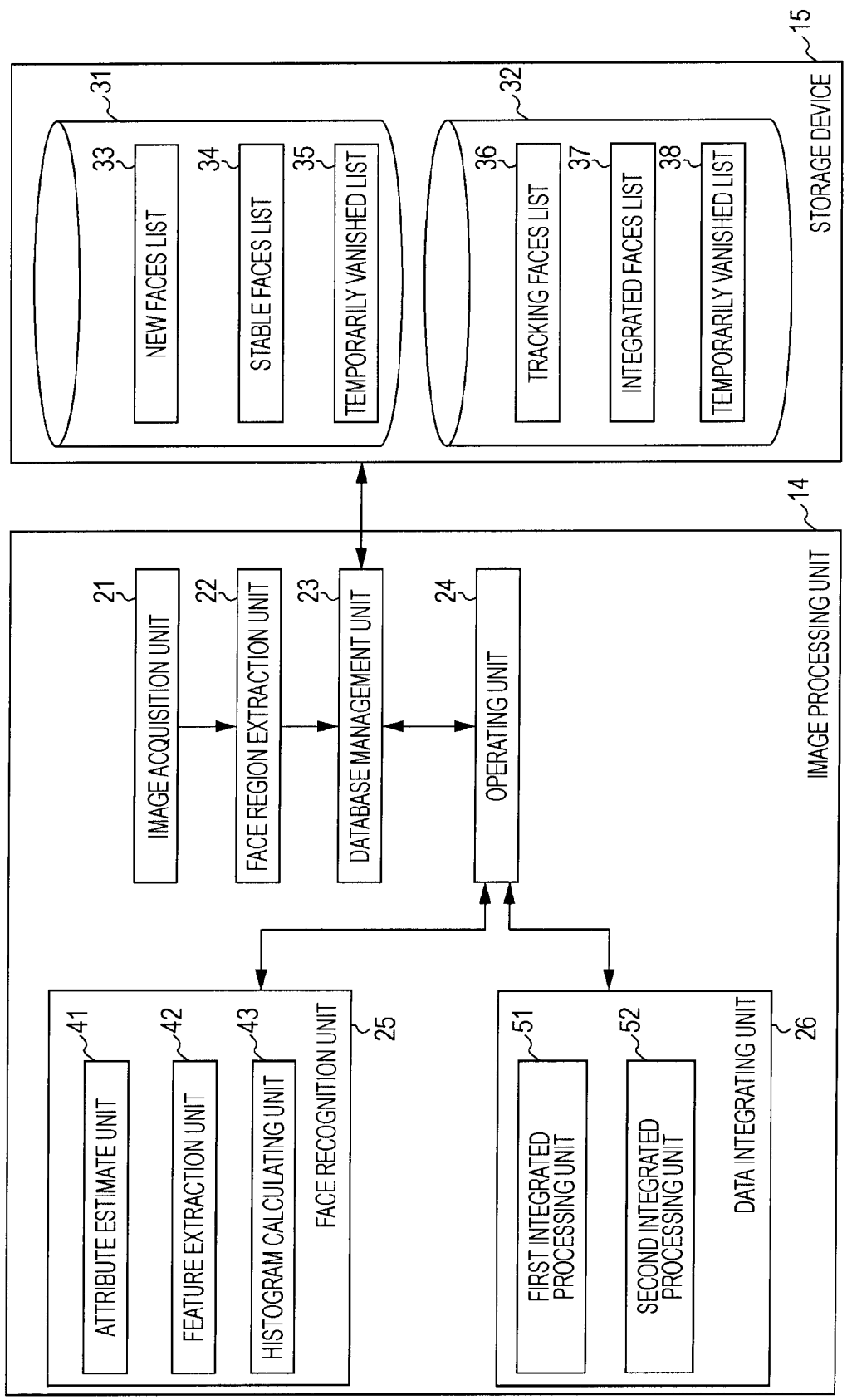
FIG. 4 is a block diagram showing the configuration of an image processing device.

Next, FIG. 4 is a block diagram showing a configuration example of the image processing device 14.

In FIG. 4, the image processing device 14 is configured having an image acquisition unit 21, a facial region extraction unit 22, a database management unit 23, an operating unit 24, a face recognition unit 25 and a data integrating unit 26. And, the storage device 15 stores two databases 31 and 32. The database 31 stores a new faces list 33, a stable faces list 34 and a temporarily vanished list 35, and the database 32 stores a tracking faces list 36, an integrated faces list 37 and a temporarily vanished list 38.

The image acquisition unit 21 acquires an image (a freeze frame) of the respective frames in sequence from a moving picture captured by the capturing device 13 of FIG. 1, and provides an image one frame at a time to the facial region extraction unit 22 after assigning a frame number (information corresponding to time) to each frame.

The facial region extraction unit 22 processes searching (entire screen search) for a face pictured in an image for an entire screen of an image supplied from the image acquisition unit 21. The facial region extraction unit 22 generates the facial region information which shows the position and size of the facial region (see FIG. 2) of a face searched by the entire screen search.

Also, the facial region extraction unit 22 acquires an enlarged facial region image by cutting an enlarged facial area (see FIG. 2) including the facial region from an image. For example, in the case that a plurality of faces are pictured in an image on the present frame (the objective frame being processed), the facial region extraction unit 22 acquires the facial region information and an enlarged facial area for each face. Furthermore, the facial region extraction unit 22 provides the facial region information and an enlarged facial area image acquired from an image for that frame to the database management unit 23 after assigning a frame number to the present frame.

The database management unit 23 manages each list, including a new faces list 33, a stable faces list 34 and a temporarily vanished list 35, a tracking faces list 36, an integrated faces list 37 and a temporarily vanished list 38, residing in the databases 31 and 32 stored in the storage device 15.

Information pertaining to a newly detected face is registered in the new faces list 33, and the information pertaining to a face exceeding a predetermined frame number after being registered to the new faces list 33 is transferred to and registered in the stable faces list 34. When the information pertaining to a face registered in the new faces list 33 and the stable faces list 34 vanishes, the information pertaining to the face is transferred to and registered in the temporarily vanished list 35 from the new faces list 33 or the stable faces list 34. Also, the information exceeding a predetermined storage period after being registered in the temporarily vanished list 35 is deleted from the temporarily vanished list 35.

Furthermore, all information pertaining to the face being tracked is registered to the tracking faces list 36. When a face relating to the information registered in the tracking faces list 36 vanishes, information pertaining to the face integrated-processed according to a comparison result of the vanished face and a face relating to the information registered in the temporarily vanished list 38 is registered in the integrated faces list 37. When a face relating to the information registered in the tracking faces list 36 vanishes, the information pertaining to the face is transferred to and registered in the temporarily vanished list 38 from the tracking faces list 36. Also, information exceeding a predetermined storage period after being registered in the temporarily vanished list 38 is deleted from the temporarily vanished list 38.

In each list of the storage device 15, a face being tracked is managed with the same tracking ID. The database management unit 23 provides facial region information acquired from an image on the present frame to the operating unit 24, and assigns a tracking ID by determining if a face is a face being tracked based on a redundancy calculated by the operating unit 24.

The operating unit 24 accumulates temporarily the facial region information pertaining to a face pictured in an image on the previous frame, and calculates a redundancy, which is an overlap ratio of each facial region, based on the position and size of a facial region in an image on the present frame and the position and size of a facial region in an image on the previous frame.

The operating unit 24 provides the calculated redundancy to the database management unit 23, and the database management unit 23 determines that it is a face being tracked when the redundancy is equal to or greater than the threshold value based on a threshold value for determining if it a face is a face being tracked, and then assigns the same tracking ID, which is the same tracking ID be assigned to the facial region of an image on the previous frame with which the redundancy is calculated for facial region information acquired from an image on the present frame. On the other hand, the database management unit 23 assigns a new tracking ID as a newly detected face to facial region information for the present frame when the redundancy is below the threshold value. Additionally, the threshold value for determining if a face is a face being tracked is a value determined by calculation or experiment based on how far the person in the image can move between frames captured by the capturing device 13.

Also, the operating unit 24 provides information representing the moving speed to the database management unit 23 by calculating the moving speed of the face based on a position of a facial region in an image on the present frame and a position of a facial region in an image on the previous frame, and a frame rate for a face determined as a face being tracked in the database management unit 23. Furthermore, the operating unit 24 estimates a position of a facial region in an image on the present frame based on a position of a facial region in an image on the previous frame and a moving speed, and calculates a redundancy using the estimated position and a position of a facial region in an image on the present frame.

In addition, the database management unit 23 provides an enlarged facial area image acquired from an image on the present frame to the face recognition unit 25 to process face recognition.

The face recognition unit 25 includes an attribute estimating unit 41, a feature extraction unit 42 and a histogram calculating unit 43.

The attribute estimating unit 41 provides information representing an attribute to the database management unit 23 by estimating a variety of attributes pertaining to a face based on facial characteristics in a facial region included in the enlarged facial area image from the database management unit 23. The attributes of a face estimated by the attribute estimating unit 41 are gender (male/female), age group (for example, the age group in the range of 10 years, or toddler/youth/adult), race (white/black/yellow), and the like.

The feature extraction unit 42 specifies a face angle and a facial expression (smiling face/non smiling face) of the face based on facial characteristics in a facial region included in an enlarged facial area image from the database management unit 23. Also, the feature extraction unit 42 extracts the features representing facial characteristics in a facial region included in an enlarged facial area image in the case that the predetermined conditions extracting the features are satisfied.

For instance, as shown in FIG. 5, the feature extraction unit 42 extracts the features such as the smiling/not-smiling faces for every face angle (Yaw) for five sideward angles. In the example of FIG. 5, the face angles are divided into left side face angles of −22.5 degrees, a face angle of −22.5 to −7.5 degrees, a face angle of −7.5 to 7.5 degrees, a face angle of 7.5 to 22.5 degrees and right side face angles of 22.5 degrees assuming the front face angle is 0 degrees. Like this, the feature extraction unit 42 stores 10 patterns of facial features for five face angles and 2 facial expressions.

Additionally, the feature extraction unit 42 extracts the features so as not to have the same pattern of features. Firstly, the feature extraction unit 42 extracts the features of a face for the expression and a face angle when the features corresponding to the facial expressions and the face angles of a face which is an objective to be processed are not extracted (in FIG. 5, the corresponding boxes are blank).

Secondly, even if the features corresponding to the expression and the face angles of an objective face to be processed have been extracted, the feature extraction unit 42 extracts the features of the facial expression and the face angle when a face angle of a face which is a processing objective is closer to the center of the face angle range than the face angle of a face for which the features are extracted. For example, even if the features of a face angle of −7.5 to 7.5 degrees are being extracted, if the present face angle other than the face angle for the features which have been extracted is closer to 0 degrees, the feature extraction unit 42 extracts the features.

Thirdly, even if the features corresponding to the facial expression and the face angle for the processing objective have been extracted, if the blurriness of an image of a face as a processing objective other than the blurriness of an image of a face for which the features have been extracted is lower, the feature extraction unit 42 extracts the facial features. Also, an enlarged facial area image of the face for which the features have been extracted is stored in the storage device 15 together with the features, and the feature extraction unit 42 compares the blurriness referring to the enlarged facial area image.

The feature extraction unit 42 provides information representing the facial features to the database management unit 23 by extracting the features of a face which is a processing objective, when satisfying one condition out of the above-mentioned three conditions. Also, the feature extraction unit 42 performs the extraction of the facial features at a time in which an enlarged facial area image is provided from the database management unit 23, more specifically, at a time in which the facial region extraction unit 22 performs an entire screen search. Additionally, by extracting the features with the above-mentioned conditions, the repetition of the same pattern of features is avoided, and it is possible to extract the features from an image with the face angle and blurriness capable of extracting better features.

Additionally, the feature extraction unit 42 extracts a facial feature for each face angle (pitch) lengthwise in addition to the extraction of a facial feature for each a face angle (Yaw) widthwise. Also, it is possible to subdivide into the non-smiling faces such as angry or sad expressions when extracting the facial features. Thus, subdividing the extracted facial features allows for increasing the accuracy of the integrated processing which will be described later.

The histogram calculating unit 43 provides information representing a histogram to the database management unit 23 by calculating a histogram (a color histogram) of each area from a plurality of areas for the facial region of an enlarged facial area image.

For example, as shown in FIG. 6, the histogram calculating unit 43 deletes (for example, coloring it all with a certain color) the background within an enlarged facial area image by calculating the background difference from an enlarged facial area image provided from the database management unit 23, and separating the background from the facial region (an area in which person other than the background is present). Next, the histogram calculating unit 43 sets 3 areas (upper area, left side area and right side area) in a facial periphery area and 3 areas (right chest area, middle chest area and left chest area) in the lower side of the facial region as areas extracting a histogram. The histogram calculating unit 43 extracts an RGB three-dimensional histogram from each area. Also, the color histogram calculating unit 43 provides a histogram calculated for each frame during tracking of a face to the database management unit 23.

Like this, by face recognition processing by the face recognition unit 25, for a face within a facial region, information representing the face attributes is output from the attribute estimating unit 41, information representing the facial features is output from the feature extraction unit 42 and information representing a histogram in a facial periphery area and a chest area is output from the histogram calculating unit 43. The database management unit 23 registers the information representing the attributes, the information representing the features and the information representing the histograms (hereinafter, this information is called identification information) to the databases 31 and 32 stored in the storage device 15 together with the enlarged facial area image.

For example, the database management unit 23 registers facial region information assigning a new tracking ID, an enlarged facial area image corresponding to the facial region information, information representing the attributes, information representing the features and information representing the histograms in the new faces list 33 and the tracking faces list 36 by generating a new entry. Also, the database management unit 23 registers (updates or counts) facial region information assigning the same tracking ID as the face being tracked to the entry for that tracking ID.

The data integrating unit 26 can perform integrated processing of a plurality of different processing contents, and, for example, can select an integrated processing according to the purpose of use of the image processing result, or an integrated processing according to a plurality of purposes in parallel, according to the control of the control device 17 of FIG. 1.

In the embodiment of the present invention, the data integrating unit 26 includes a first integrated processing unit 51 and a second integrated processing unit 52. For example, the first integrated processing unit 51 handles the purposes necessary to have a high response, and performs an integrated processing for the data registered in the database 31 at a time in which one to a few frames are passed after a new face is detected. Also, the second integrated processing unit 52 handles the purposes necessary to have more accurate results and performs an integrated processing for the data registered in the database 32 at a time in which a face being tracked is vanished.

For example, the database management unit 23 reads information pertaining to a face from the new faces list 33 and provides it to the first integrated processing unit 51 for information pertaining to a face registered in the new faces list 33, at a time in which a predetermined number of frames (a predetermined time period) from the frame of newly detected face is passed. Integrated processing by the first integrated processing unit 51 will be described later referring to a flow chart in FIG. 9.

Furthermore, the database management unit 23 provides information pertaining to a face at a time in which a face being tracked is vanished by reading it from the tracking faces list 36 to the second integrated processing unit 52. Integrated processing by the second integrated processing unit 52 will be described later referring to a flow chart in FIG. 10.

Figure 7:
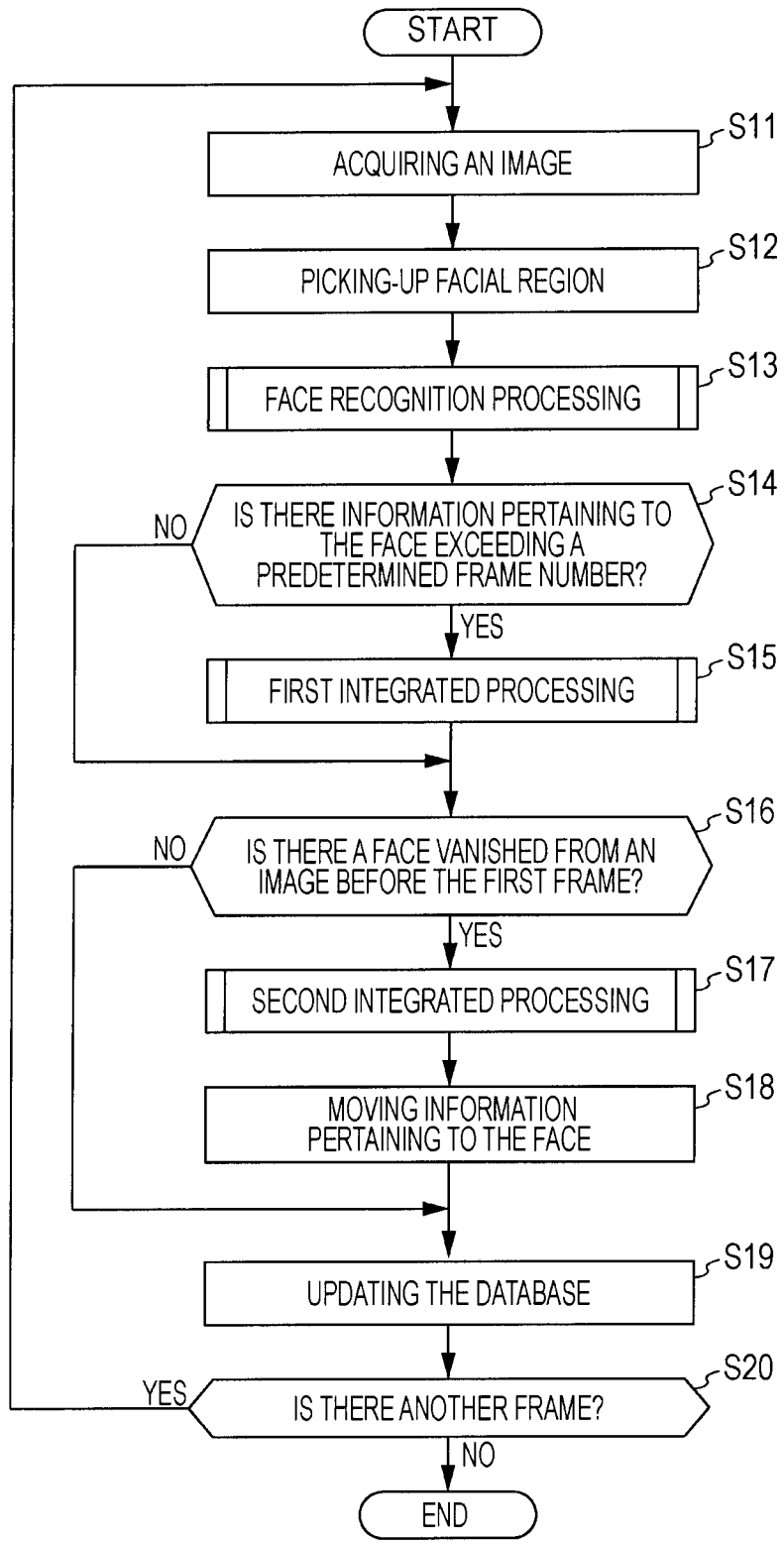
FIG. 7 is a flow chart showing the tracking process of a face pictured in an image.

Next, FIG. 7 is a flow chart showing a tracking process of a face pictured in an image by the image processing device 14 in FIG. 4.

The process starts with the initiating of the display of a video commercial by the digital signage system 11 in FIG. 1, and at step S11 the image acquisition unit 21 acquires (reads a data on a freeze frame) an image of one frame of a moving picture captured by the capturing device 13, and provides the image to the facial region extraction unit 22.

After the processing step S11, the procedure proceeds to step S12, and the facial region extraction unit 22 performs an entire screen search for an image provided from the image acquisition unit 21. And, the facial region acquisition unit 22 generates facial region information representing the position and size of the facial region as a search result of the entire screen search, and acquires an enlarged facial area image including the facial region. The facial region extraction unit 22 provides the facial region information and the enlarged facial area image to the database management unit 23, and the procedure proceeds to step S13.

At step S13, the database management unit 23 performs a face recognition process (process in FIG. 8 which will be described later) using facial region information and an enlarged facial area image from the facial region extraction unit 22 along with the operating unit 24 and the face recognition unit 25, and the procedure proceeds to step S14.

At step S14, the database management unit 23 determines if there is information pertaining to a face exceeding a predetermined frame number from the frames in which faces are detected, referring to the new faces list 33 residing in the database 31 of the storage device 15.

At step S14, if the database management unit 23 determines that there is information pertaining to a face exceeding a predetermined frame number from the frames in which faces are detected, the procedure proceeds to step S15 and the first integrated processing (process in FIG. 9 will be described later) is performed. After the first integrated processing at step S15 is finished, the procedure proceeds to step S16.

On the other hand, at step S14, if the database management unit 23 determines that there is no information pertaining to a face exceeding a predetermined frame number from the frames in which faces are detected, the procedure proceeds to step S16 skipping step S15.

At step S16, the database management unit 23 determines if there is face that has vanished from an image on the previous frame in the image on the present frame.

At step S16, if the database management unit 23 determines that in the image on the present frame there is a face that has vanished from an image on the previous frame, the procedure proceeds to step S17 and the second integrated processing (process in FIG. 10 which will be described later) is performed. After the second integrated processing at step S17 is finished, the procedure proceeds to step S18.

At step S18, the database management unit 23 performs processing of information pertaining to a face that has vanished from an image on the previous frame in the image on the present frame. That is, the database management unit 23 transfers the information pertaining to a vanished face registered in the new faces list 33 or the stable faces list 34 of the database 31 to the temporarily vanished list 35. Also, the database management unit 23 transfers the information pertaining to a vanished face registered in the tracking faces list 36 of the database 32 to the temporarily vanished list 38. At that time, the database management unit 23 adds the frame number on the present frame to the information when transferring to the temporarily vanished list 35 and the temporarily vanished list 38 to information pertaining to face information showing a vanishing time. After the process at step S18 is finished, the procedure proceeds to step S19.

On the other hand, at step S16, if the database management unit 23 determines that in an image on the present frame there is no face vanished from an image on the previous frame, the procedure proceeds to step S19 skipping steps S17 and S18.

At step S19, the database management unit 23 deletes the information pertaining to a face exceeding a predetermined storage period after the face has vanished from an image, by referring to vanishing time information added to information pertaining to a face registered in the temporarily vanished list 35 and the temporarily vanished list 38, and the procedure proceeds to step S20.

At step S20, the database management unit 23 decides if there is another frame to be processed, and in the case that it determines that there is another frame to be processed, the procedure returns back to step S11 and the same following process is repeated. However, if the database management unit 23 decides that there isn't another frame, the procedure ends.

Figure 8:
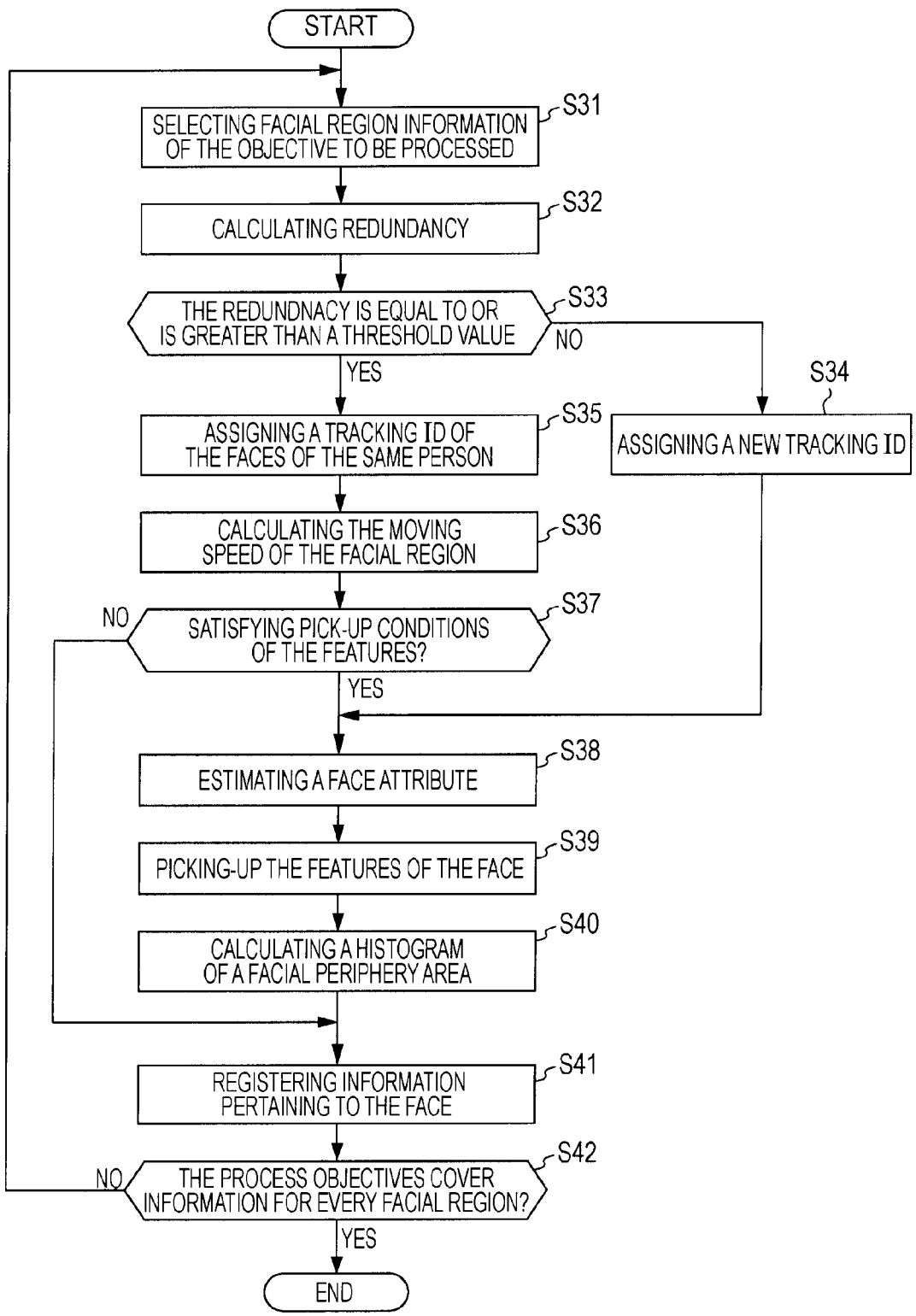
FIG. 8 is a flow chart showing the face recognition process.

Next, FIG. 8 is a flow chart describing the face recognition process in step S13 of FIG. 7.

At step S31, the database management unit 23 selects facial region information, for example, which can be the processing objective in the extraction sequence, from the facial region information extracted from an image on the present frame, and provides it to the operating unit 24.

After processing step S31, the procedure proceeds to step S32, and the operating unit 24 calculates a redundancy between a facial region relating to facial region information of the processing objective and the facial region relating to all facial region information extracted from an image on the previous frame, and the procedure proceeds to step S33.

At step S33, the database management unit 23 determines if the redundancy calculated by the operating unit 24 at step S32 is equal to or greater than a threshold value for determining if a face is a face being tracked.

At step S33, if the database management unit 23 decides that the redundancy calculated by the operating unit 24 is below the threshold value, the procedure proceeds to step S34. At step S34, the database management unit 23 assigns a new tracking ID to the facial region information of the processing objective. That is, in this case, since a facial region relating to facial region information of the processing objective is far away from any part of a facial region based on a facial region information extracted from an image on the previous frame, a face corresponding to a facial region information of the processing objective is determined as a newly detected face in an image on the present frame.

However, at step S33, if the database management unit 23 determines that the redundancy calculated by the operating unit 24 is equal to or greater than the threshold value, the procedure proceeds to step S35. At step S35, the database management unit 23 assigns the same tracking ID as the tracking ID of the facial region information having a value which is equal to or greater than the threshold value, to the facial region information of the processing objective. In other words, in this case, a face relating to the facial region information of the processing objective is determined as a face being tracked. Also, when there are a plurality of facial region information records which have values being equal to or greater than the threshold value, a tracking ID of the facial region information with the highest redundancy is assigned to the facial region information of the processing objective.

After processing step S35, the procedure proceeds to step S36, and the database management unit 23 notifies the operating unit 24 of the tracking ID assigned to the facial region information of the processing objective, and at the same time, notifies the operating unit 24 of the facial region information determined as a face being tracked. The operating unit 24 calculates a moving speed of the face determined as the face being tracked, based on the position of the facial region of the processing objective and the position of the facial region in an image on the previous frame, and a frame rate, and provides information showing the moving speed to the database management unit 23.

After processing step S36, the procedure proceeds to step S37, and the database management unit 23 provides an enlarged facial area image to the feature extraction unit 42. The feature extraction unit 42 specifies the angles and expressions of a face in a facial area included in an enlarged facial area image, and decides if they meet the feature extraction conditions, more specifically, any one of the above-mentioned three conditions, by referring to the databases 31 and 32.

At step S37, if the feature extraction unit 42 decides that the feature extraction conditions are met, the procedure proceeds to step S38, and the database management unit 23 provides an enlarged facial area image to the attribute estimating unit 41. The attribute estimating unit 41 estimates a variety of attributes pertaining to the face based on the face characteristics in a facial region included in the enlarged facial area image, and provides information representing the attributes to the database management unit 23, and the procedure proceeds to step S39.

At step S39, the feature extraction unit 42 extracts the features representing the face characteristics in a facial region included in the enlarged facial area image, and provides information representing the features to the database management unit 23, and the procedure proceeds to step S40.

At step S40, the database management unit 23 provides an enlarged facial area image to the histogram calculating unit 43. The histogram calculating unit 43 provides information representing a histogram to the database management unit 23 by extracting a histogram from 3 areas (upper area, right side area and left side area) in the facial periphery area and 3 areas (right chest area, middle chest area and left chest area) in the lower side of a facial region.

After processing step S40, or when the feature extraction unit 42 determines that the feature extraction conditions are not met at step S37, the procedure proceeds to step S41. At step S41, the database management unit 23 registers facial region information of the processing objective, an enlarged facial area image, information showing the moving speed, information representing the attributes, information representing the features and information representing a histogram to the databases 31 and 32 stored on the storage device 15. At that time, the database management unit 23 generates and registers a new entry when a new tracking ID is assigned at step S34, and registers in a corresponding entry that has already been generated when the same tracking ID as a face being tracked is assigned at step S35.

After processing step S41, the procedure proceeds to step S42, and the database management unit 23 decides if the entire facial region information extracted from an image on the present frame has been processed, and if it determines that the entire facial region has not been processed, the procedure returns back to step S31, and the same process is repeated. On the other hand, if the database management unit 23 decides that the entire facial region has been processed, the procedure ends.

Figure 9:
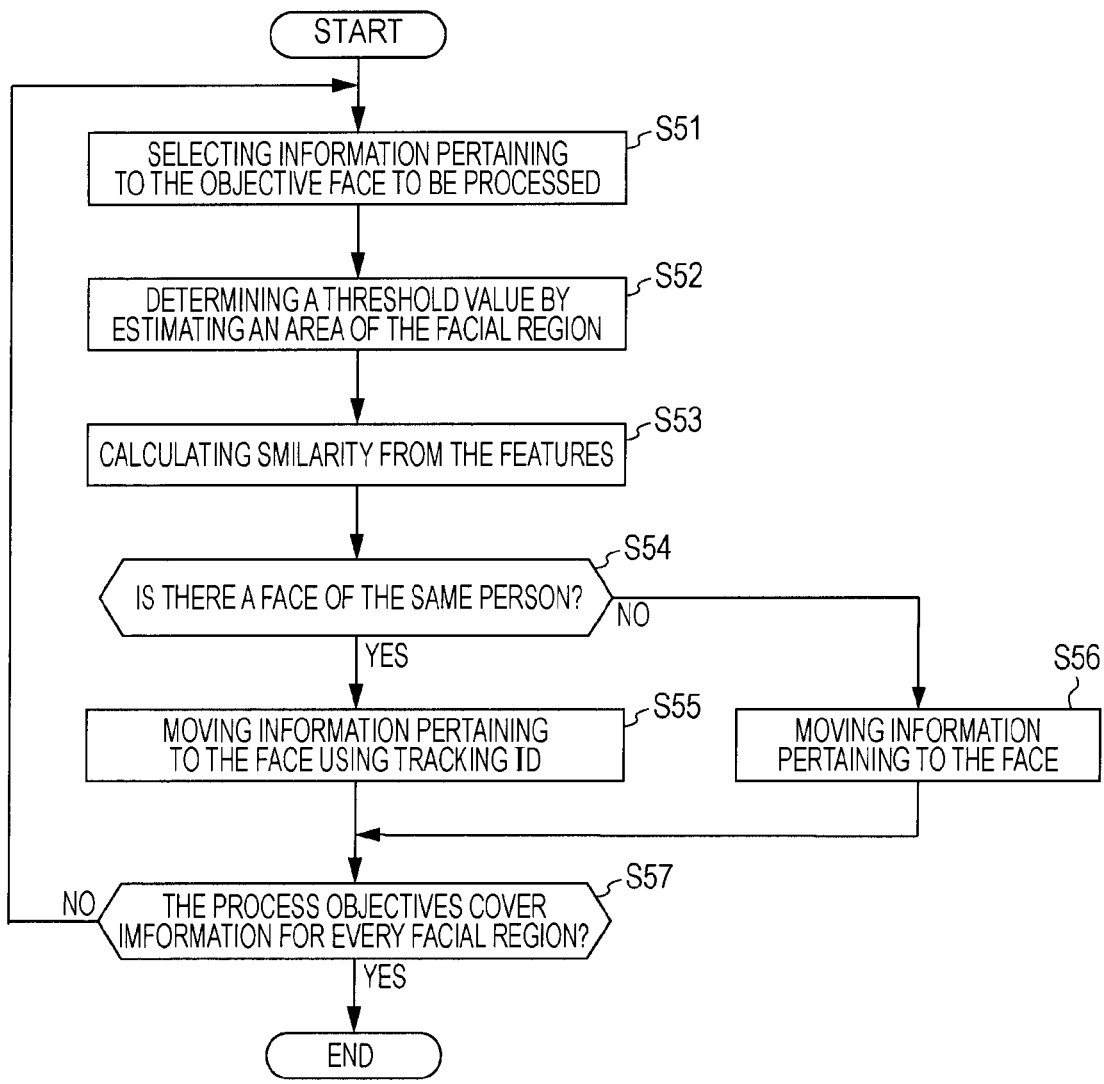
FIG. 9 is a flow chart illustrating the first integrated processing.

Next, FIG. 9 is a flow chart describing the first integrated processing in step S15 of FIG. 7.

At step S51, the database management unit 23 selects information pertaining to a face, for example, which is the processing objective, in the tracking ID sequence from information pertaining to a face exceeding a predetermined frame number, from the new faces list 33 residing in the database 31 of the storage device 15, and provides it to the first integrated processing unit 51.

After processing step S51, the procedure proceeds to step S52, and the first integrated processing unit 51 determines a threshold value for determining if the face of the processing objective and the face of the same person are registered in the temporarily vanished list 35, by requesting an estimating range in which a facial region of a face registered in the temporarily vanished list 35 is predicted to appear in an image on the present frame.

The information pertaining to a face registered in the temporarily vanished list 35 includes a frame number of a frame of the vanished face, facial region information showing when a face vanishes and information showing a moving speed. The first integrated processing unit 51 calculates a time (a difference of the frame numbers×frame rate) from a frame of the vanished face to the present frame, estimates a moving distance from the time and the moving speed, and estimates that the vanished face appears in an estimated range (for example, a 1.5 times range of a facial region) which is an area further away from a position of a facial region when a face vanishes, using only the moving distance.

And, the first integrated processing unit 51 sets a threshold value for determining which faces are necessary to have the estimated range to a high value when a face being processed is out of the estimated range, and sets a threshold value for determining which faces are necessary to have the estimated range to be a low value when a face being processed is within the estimated range. In addition, besides changing of the threshold value using the estimated position, the first integrated processing unit 51 estimates, for example, the size of a facial region or the face direction, and when those estimations are used, the threshold value is allowed to be low.

After processing step S52, the procedure proceeds to step S53, the first integrated processing unit 51 calculates the similarities between the faces based on the features of the face being processed and the features of a face registered in the temporarily vanished list 35.

After processing at step S53, the procedure proceeds to step S54, and the first integrated processing unit 51 decides if the face of the same person as the face of the processing objective is registered in the temporarily vanished list 35. In other words, the first integrated processing unit 51 determines if the similarity calculated in step S53 is equal to or greater than the threshold value determined at step S52, and if there is a similarity that is equal to or greater than the threshold value, it determines that the face of the same person as the face of the processing objective is registered in the temporarily vanished list 35. However, in the case that there is no similarity that is equal to or greater than the threshold value, it decides that the face of the same person as the face of the processing objective is not registered in the temporarily vanished list 35.

At step S54, if the first integrated processing unit 51 determines that the face of the same person as the face of the processing objective is registered in the temporarily vanished list 35, the procedure proceeds to step S55. At step S55, the first integrated processing unit 51 correlates the tracking ID of the information pertaining to the face of the processing objective to the tracking ID assigned to the information pertaining to a face with the highest similarity from the information registered in the temporarily vanished list 35, and integrates the information pertaining to those faces. Also, the database management unit 23 registers the information pertaining to a face in which the tracking ID is correlated to the stable faces list 34, and at the same time, deletes the information registered in the new faces list 33 and the temporarily vanished list 35.

However, at step S54, if the first integrated processing unit 51 decides that the face of the same person as the face of the processing objective is not registered in the temporarily vanished list 35, the procedure proceeds to step S56. At step S56, the database management unit 23 transfers the information pertaining to the face of the processing objective to the temporarily vanished list 35 from the new faces list 33.

After processing step S55 or S56, the procedure proceeds to step S57, and the database management unit 23 determines if information pertaining to every face exceeding a predetermined frame number has been processed, and if it decides that information pertaining to every face exceeding a predetermined frame number has not been processed, the procedure returns back to step S51, and the same process is repeated. On the other hand, if the database management unit 23 decides that the information pertaining to every face has been processed, the procedure ends.

Like this, since the first integrated processing unit 51 determines a threshold value for deciding if the face of the processing objective is a temporarily vanished face based on the estimated range in which the vanished face is predicted to appear, the accuracy in detecting the temporarily vanished face increases as compared to determining a fixed threshold value. Also, for example, it is possible to perform a first integrated processing for a frame of a newly detected face, and in this time, when the predetermined frame number is 1, an integrated result can be obtained quickly, thereby, real time performance can be improved.

Figure 10:
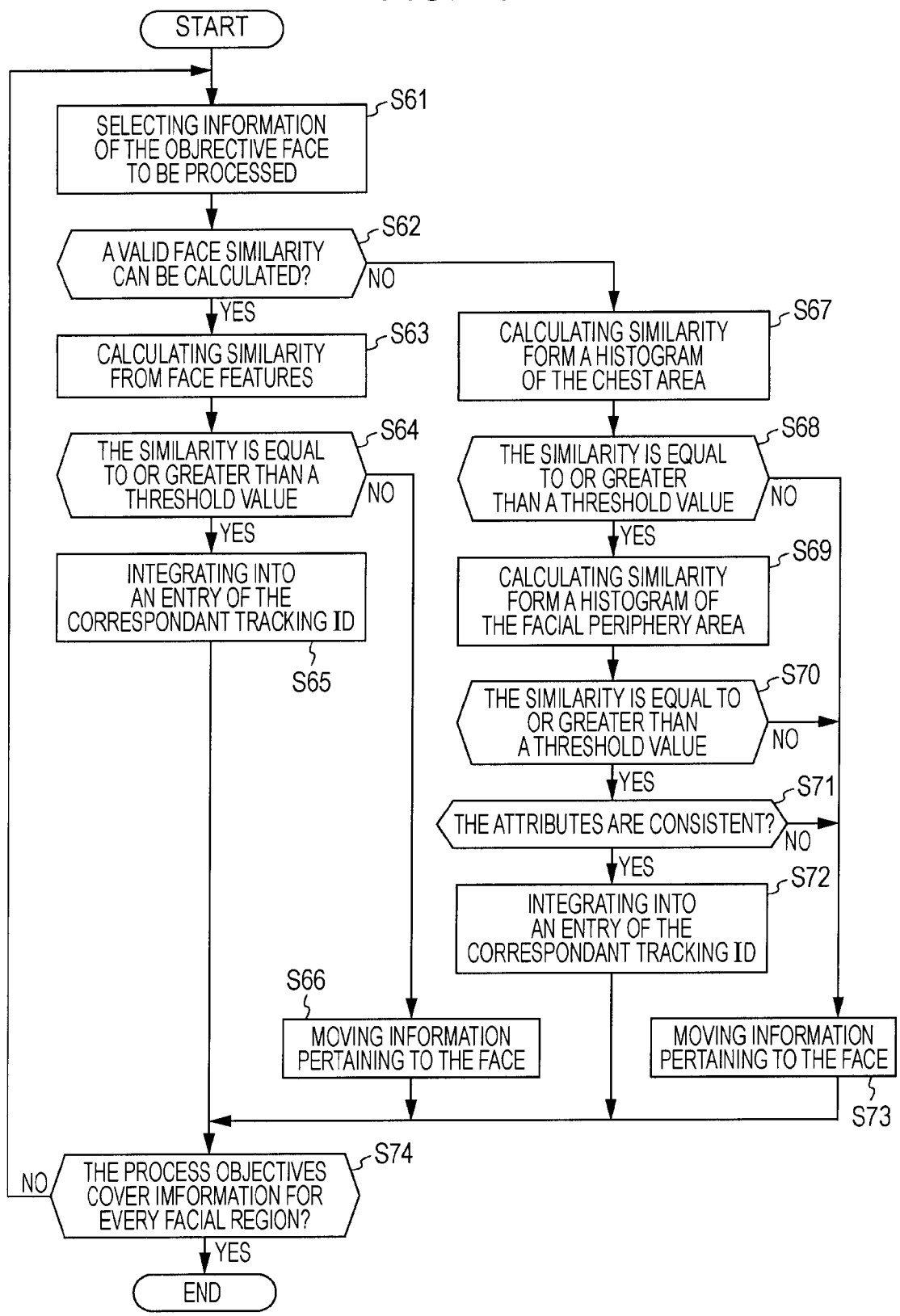
FIG. 10 is a flow chart illustrating the second integrated processing.

Next, FIG. 10 is a flow chart describing a second integrated processing in step S17 of FIG. 7.

At step S61, the database management unit 23 selects the information pertaining to a face, which is the processing objective, for example, in the tracking ID sequence from the information pertaining to a face vanished from an image on the previous frame in an image on the present frame, from the tracking faces list 36 residing in the database 32 of the storage device 15, and provides it to the second integrated processing unit 52.

After processing step S61, the procedure proceeds to step S62, and the second integrated processing unit 52 determines if a valid face similarity can be calculated based on an enlarged facial area image included in the information provided pertaining to a face.

For instance, in the case that the size of a facial region included in an enlarged facial area image is small, more specifically, the size is equal to or smaller than 40 pixels, a valid face similarity may be incapable of being calculated. Additionally, when an image has the blurriness, a valid face similarity may be incapable of being calculated. Thus, the second integrated processing unit 52 determines that a valid face similarity can be calculated when the size of a facial region included in an enlarged facial area image is equal to or greater than a predetermined value and there is no blurriness in an image. On the other hand, the second integrated processing unit 52 determines that a valid face similarity may be incapable of being calculated when the size of a facial region included in an enlarged facial area image is below a predetermined value and there is the blurriness in an image.

At step S62, when the second integrated processing unit 52 decides that a valid face similarity can be calculated, the procedure proceeds to step S63, and the second integrated processing unit 52 calculates the similarities between the respective faces, on the basis of the features of the face of the processing objective and the features of a face registered in the temporarily vanished list 38. At that time, the second integrated processing unit 52 calculates the respective corresponding face similarities for each of the 5 face directions, as described in FIG. 3.

After processing step S64, the procedure proceeds to step S64, and the second integrated processing unit 52 determines if the face similarity calculated at step S63 is equal to or greater than a threshold value.

At step S64, if the second integrated processing unit 52 determines that the face similarity calculated at step S63 is equal to or greater than a threshold value, the procedure proceeds to step S65. That is, in this case, the face of the processing objective is determined to be a temporarily vanished face.

At step S65, information pertaining to a face with the calculated highest similarity out of the information registered in the temporarily vanished list 35 is transferred to the integrated faces list 37, and at the same time, information pertaining to a face being the processing objective is transferred to and registered in an entry of the face ID of the information from the tracking faces list 36.

On the other hand, at step S64, if the second integrated processing unit 52 determines that the face similarity calculated at step S63 is below the predetermined threshold value, the procedure proceeds to step S66. That is, in this case, the face of the processing objective is determined to be a newly detected face not a temporarily vanished face.

At step S66, the second integrated processing unit 52 assigns a new face ID to the face of the processing objective, generates a new entry in the integrated faces list 37, and transfers information pertaining to the face of the processing objective from the tracking faces list 36 to it.

However, at step S62, if the second integrated processing unit 52 decides that a valid face similarity may be incapable of being calculated, the procedure proceeds to step S67. At step S67, the second integrated processing unit 52 calculates the similarities between the chest areas on the basis of the histograms extracted from 3 areas (right chest area, middle chest area and left chest area) of the lower side of the facial region and the histogram corresponding to a face registered in the temporarily vanished list 38 out of the information representing the histograms included in the information pertaining to the face of the processing objective.

After processing step S67, the procedure proceeds to step S68, and the second integrated processing unit 52 determines if the chest area similarity calculated at step S67 is equal to or greater than a threshold value.

At step S68, if the second integrated processing unit 52 decides that the chest area similarity calculated at step S67 is equal to or greater than the threshold value, the procedure proceeds to step S69. At step S69, the second integrated processing unit 52 calculates the similarities between the chest areas on the basis of the histograms extracted from 3 areas (upper side area, right side area and left side area) of a facial periphery area out of information representing the histograms included in the information pertaining to the face of the processing objective, and the histograms corresponding to the faces with the chest similarities having values equal to or greater than the threshold value among the faces registered in the temporarily vanished list 38.

After processing step S69, the procedure proceeds to step S70, and the second integrated processing unit 52 determines if the facial periphery areas similarities calculated at step S69 are equal to or greater than the predetermined threshold value.

At step S70, if the second integrated processing unit 52 decides that the facial periphery areas similarities calculated at step S69 are equal to or greater than the predetermined threshold value, the procedure proceeds to step S71. At step S71, the second integrated processing unit 52 decides if the information representing the attributes included in the information pertaining to the face of the processing objective is consistent with the facial attributes with the facial periphery areas similarities having values equal to or greater than the threshold value among the faces registered in the temporarily vanished list 38.

At step S71, if the second integrated processing unit 52 decides that the information representing the attributes included in the information pertaining to the face of the processing objective is consistent with the information representing the attributes of the faces registered in the temporarily vanished list 38, the procedure proceeds to step S72. In other words, when it has been determined that the chest area similarity is equal to or greater than the threshold value, the facial periphery area similarity is equal to or greater than the threshold value and the attributes are consistent, the face of the processing objective is determined to be a temporarily vanished face.

At step S72, the second integrated processing unit 52 transfers information pertaining to a face for which it has been determined at step S71 that the attributes are consistent, to the integrated faces list 37, and at the same time, transfers information pertaining to the face of the processing objective to and registers it in the entry of the face ID for the information from the tracking faces list 36.

However, at step S68 if the chest area similarities calculated at step S67 are below the predetermined threshold value, at step S70 if it is determined that the facial periphery area similarities calculated at step S69 are below the predetermined threshold value or at step S71 if it is determined that information representing the attributes is not consistent, the procedure proceeds to step S73.

At step S73, the second integrated processing unit 52 assigns a new face ID to information pertaining to the face of the processing objective, generates a new entry in the integrated faces list 37, and transfers the information pertaining to the face of the processing objective from the tracking faces list 36.

After processing step S65, S66, S72 or S73, the procedure proceeds to step S74, and the database management unit 23 determines if the information pertaining to every face vanished from an image on the previous frame in an image on the present frame has been processed as the processing objective, and it decides that the information pertaining to every face has not been processed as the processing objective, the procedure returns back to step S61, and the same process is repeated. On the other hand, if the database management unit 23 decides that the information pertaining to every face has been processed as the processing objective, the procedure ends.

Like this, since the second integrated processing unit 52 determines if a face is a temporarily vanished face, using the similarities of the chest areas (for example, clothing color), the similarities of the facial periphery areas (for example, hair color, or hat color if applicable) and the attributes in addition to the facial similarities, the accuracy in detecting a temporarily vanished face increases compared to only using the facial similarity.

Furthermore, in the case that a face pictured in an image is small or greatly blurred, the accuracy of the similarity decision may degrade, and in these cases, it is desirable to determine if it is the same person with high accuracy.

For instance, referring to FIG. 11, a recognition result when integrated processing by the second integrated processing unit 52 is not performed (before processing) and a recognition result when integrated processing by the second integrated processing unit 52 is performed (after processing) are compared. As shown in FIG. 11, degradation of the reproducibility is suppressed and conformity is improved dramatically (by 2 times) by the integrated processing of the second integrated processing unit 52. Here, the reproducibility is a function of B/(A+B) when A refers to a set of the labeling results, C refers to a set of the recognition results and B refers to a product set of A set and B set. Also, the conformity is a function of B/(C+B). And, F value is a harmonic mean, and the harmonic mean can be raised by the integrated processing of the second integrated processing unit 52.

Also, when determining if a face is a temporarily vanished face, besides the above-mentioned method, for example, it is possible to determine that a face is a temporarily vanished face when the overall similarity is equal to or greater than the threshold value and the attributes are consistent, here the overall similarity can be calculated with an operation of the face similarity×a weighting factor+the chest area similarity×a weighting factor+the facial periphery area similarity×a weighting factor. In addition, it is possible to decide that a face is a temporarily vanished face when the face similarity×a weighting factor is equal to or greater than the threshold value, the facial periphery area similarity×a weighting factor is equal to or greater than the threshold value and the chest area similarity×a weighting factor is equal to or greater than the threshold value, and the attributes are consistent.

Additionally, a threshold value or a weighting factor which is a function of the time from vanishing of a temporarily vanished face to a time of the detection of a new face can be employed besides using the threshold value or a weighting factor with a fixed value. That is, when the vanished time is short, a low threshold value can be used to determine a similarity.

Also, a normalization correlation of the Gabor characteristic vector can be used for the face similarity. And, the conversion among the 3 dimensional color histograms can be used for the chest area similarity and the facial periphery area similarity.

In addition, when integrating the information pertaining to a face, besides storing all the information, it is possible to store the newest information only, the oldest information only, or information in the best condition (information with the most forward looking face or information acquired from an image with the least blur) only. Also, a predetermined number of information records can be stored by ranking the freshness of the information and the condition of the information.

Additionally, in the embodiment of the invention even though a similarity has been determined by calculating the histograms from each area in an enlarged facial area shown in FIG. 6 by the histogram calculating unit 43, besides the histogram, in order to determine a similarity, for example, the edge directions or texture information can be used by acquiring the edge directions or texture information. With this, it is possible to determine more accurately if a face is consistent. Also, the position or size of an area for calculating a histogram by face directions (face angles) within a facial region can be changed. For example, when a face looks to the left, by enlarging the left side area and the left chest area, a histogram from an area with a better image condition can be calculated, thereby, the decision accuracy can be improved.

Also, the facial region extraction unit 22 can perform the extraction of a facial region a few frames at a time from images provided from the image acquisition unit 21. With this, the processing load can be reduced, and even if the processing performance of the image processing device 14 is low, face recognition processing or integrated processing can be performed. And, even though the facial region redundancy has been used to determine if a face is a face being tracked, it is possible to calculate a similarity by requesting the facial features, and decide if a face is a face being tracked by determining if the similarity is high or not.

Also, even if in the image processing device 14 in FIG. 4 the data integrating unit 26 has the first integrated processing unit 51 and the second integrated processing unit 52, the image processing device 14 can be configured to have any one of these two integrated processing units. In this case, only one corresponding database of the two databases 31 and 32 is stored in the storage device 15. And, in addition to the first integrated processing unit 51 and the second integrated processing unit 52 performing an integrated processing in parallel, for example, it is possible to perform integrated processing using any one unit according to the instructions from a user through the communication device 16 in FIG. 1, depending on the purpose of use of the image processing result.

The series of above mentioned processes can be carried out by hardware or software. In the case of using software for a series of the processes, a program which resides in the software is installed on a computer equipped in a dedicated hardware, or a general purpose personal computer capable of executing a variety of functions by installing a variety of programs from the program recording media.

Also, a computer executable program can be a program performing the processes in time sequence as described in the specification, and a program performing the processes in parallel or at a necessary time such as a time at which a call occurs. That is, the each process described in the above mentioned flow chart does not have to be processed in time sequence according to the order in the flow chart, but may utilize parallel processing or individual processing (for example, parallel processing or processing by an object).

Also, a program can be carried out using a single CPU, or using a plurality of CPUs with which distributed processing is performed.

The present application contains subject matter related to that disclosed in Japanese Priority Patent Application JP 2009-277074 filed in the Japan Patent Office on Dec. 4, 2009 the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing device comprising:
a processing unit; and
a non-transitory computer-readable medium coupled to the processing unit storing instructions that, when executed by the processing unit, cause the device to:
    extract a facial region including a face, after detecting the face pictured in an image;
    acquire identification information for identifying a face associated with the extracted facial region;
    perform a first integrated processing by determining if a face being tracked and a face pictured in an image to be stored in a predetermined storage period after vanishing from the image are the face of the same person based on the identification information; and
    perform a second integrated processing by determining if a face being tracked and a face pictured in an image to be stored in a predetermined storage period after vanishing from the image are the face of the same person based on the identification information in a different manner from that of the first integrated processing,
    wherein the first integrated processing is performed by determining a threshold value on the basis of a relationship between an estimated area in which the stored face image is predicted to appear and a position of the face being tracked,
    calculating a similarity between the face being tracked and the stored face image, and
    determining if the face being tracked and the stored face image are the face of the same person based on the calculated similarity, and the threshold value corresponding to the stored face image used in calculating the similarity, and
    wherein the second integrated processing is performed by calculating a similarity between the face being tracked and the stored face image for a plurality of face directions, and
    determining if the face being tracked and the stored face image are the face of the same person based on the calculated similarity for the plurality of face directions.

2. An image processing method comprising the steps of:
extracting a facial region including a face, after detecting the face pictured in an image;
acquiring identification information for identifying a face associated with the extracted facial region;
performing a first integrated processing by determining if a face being tracked and a face pictured in an image to be stored in a predetermined storage period after vanishing from the image are the face of the same person based on the identification information; and
performing a second integrated processing by determining if a face being tracked and a face pictured in an image to be stored in a predetermined storage period after vanishing from the image are the face of the same person based on the identification information in a different manner from that of the first integrated processing,
wherein the first integrated processing determines a threshold value on the basis of a relationship between an estimated area in which the stored face image is predicted to appear and a position of the face being tracked,
calculates a similarity between a face being tracked and a stored face image, and
determines if the face being tracked and the stored face image are the face of the same person based on the calculated similarity, and the threshold value corresponding to the stored face image used in calculating the similarity, and
wherein the second integrated processing calculates a similarity between the face being tracked and the stored face image for a plurality of face directions, and
determines if the face being tracked and the stored face image are the face of the same person based on the calculated similarities for the plurality of face directions.

3. A non-transitory computer-readable medium having stored therein instructions for causing a processing unit to execute a method, the method comprising the steps of:
extracting a facial region including a face after detecting the face pictured in an image;
acquiring identification information for identifying a face associated with the extracted facial region;
performing a first integrated processing by determining if a face being tracked and a face pictured in an image to be stored in a predetermined storage period after vanishing from the image are the face of the same person based on the identification information; and
performing a second integrated processing by determining if a face being tracked and a face pictured in an image to be stored in a predetermined storage period after vanishing from the image are the face of the same person based on the identification information in a different manner from that of the first integrated processing,
wherein the first integrated processing determines a threshold value on the basis of a relationship between an estimated area in which the stored face image is predicted to appear and a position of the face being tracked,
calculates a similarity between the face being tracked and the stored face image, and
determines if the face being tracked and the stored face image are the face of the same person based on the calculated similarity, and the threshold value corresponding to the stored face image used in calculating the similarity, and
wherein the second integrated processing calculates a similarity between the face being tracked and the stored face image for a plurality of face directions, and
determines if the face being tracked and the stored face image are the face of the same person based on the calculated similarities for the plurality of face directions.

4. An image processing device comprising:
a processing unit; and
a non-transitory computer-readable medium coupled to the processing unit storing instructions that, when executed by the processing unit, cause the device to:
extract a facial region including a face, after detecting the face pictured in an image;
acquire identification information for identifying a face associated with the extracted facial region; and
perform an integrated processing by determining if a face being tracked and a face pictured in an image to be stored in a predetermined storage period after vanishing from the image are the face of the same person based on the identification information;
wherein the integrated processing is performed by determining a threshold value based on whether the face being tracked is located within an estimated area in which the stored face image is predicted to appear,
calculating a similarity between the face being tracked and the stored face image, and
determining if the face being tracked and the stored face image are the face of the same person based on the calculated similarity, and the threshold value corresponding to the stored face image used in calculating the similarity.

5. The image processing device according to claim 4, wherein the integrated processing is performed by estimating a facial expression associated with the extracted facial region, and
calculating a similarity between the face being tracked and the face pictured in an image to be stored in the predetermined storage period after vanishing from the image, both faces having similar facial expression.

6. An image processing method comprising the steps of:
extracting a facial region including a face after detecting the face pictured on the image;
acquiring identification information for identifying a face associated with the extracted facial region; and
performing an integrated processing by determining if a face being tracked and a face pictured in an image to be stored in a predetermined storage period after vanishing from the image are the face of the same person based on the identification information,
wherein the integrated processing determines a threshold value based on whether the face being tracked is located within an estimated area in which the stored face image is predicted to appear,
calculates a similarity between a face being tracked and a stored face image, and
determines if the face being tracked and the stored face image are the face of the same person based on the calculated similarity, and the threshold value corresponding to the stored face image used in calculating the similarity.

7. A non-transitory computer-readable medium having stored therein instructions for causing a processing unit to execute a method, the method comprising the steps of:
extracting a facial region including a face after detecting the face pictured in an image;
acquiring identification information for identifying a face associated with the extracted facial region; and
performing an integrated processing by determining if a face being tracked and a face pictured in an image to be stored in a predetermined storage period after vanishing from the image are the face of the same person based on the identification information,
wherein the integrated processing determines a threshold value based on whether the face being tracked is located within an estimated area in which the stored face image is predicted to appear, calculates a similarity between the face being tracked and the stored face image, and determines if the face being tracked and the stored face image are the face of the same person based on the calculated similarity, and the threshold value corresponding to the stored face image used in calculating the similarity.

8. An image processing device, comprising:

a processing unit; and a non-transitory computer-readable medium coupled to the processing unit storing instructions that, when executed by the processing unit, cause the device to:

extract a facial region including a face, after detecting the face pictured in an image;

acquire identification information for identifying a face associated with the extracted facial region; and perform an integrated processing by determining if a face being tracked and a face pictured in an image to be stored in a predetermined storage period after vanishing from the image are the face of the same person based on the identification information, wherein the integrated processing is performed by calculating a similarity between the face being tracked and the stored face image for a plurality of face directions, and determining if the face being tracked and the stored face image are the face of the same person based on the calculated similarities for the plurality of the face directions.

9. The image processing device according to claim 8, wherein the integrated processing is further performed by calculating a similarity between a chest area in a lower side of the face being tracked and a chest area in a lower side of the stored face image, and determining if the stored face image is the face of the same person based on the calculated similarity of the chest area.

10. The image processing device according to claim 8, wherein the integrated processing is further performed by calculating a similarity between a facial periphery of the face being tracked and the facial periphery of the stored face image, and determining if the stored face image is the face of the same person based on the calculated similarity of the facial periphery area.

11. An image processing method comprising the steps of:

extracting a facial region including a face after detecting the face pictured on the image;

acquiring identification information for identifying a face associated with the extracted facial region; and performing an integrated processing by determining if a face being tracked and a face pictured in an image to be stored in a predetermined storage period after vanishing from the image are the face of the same person based on the identification information, wherein the integrated processing calculates a similarity between a face being tracked and a stored face image for a plurality of face directions, and determines if the face being tracked and the stored face image are the face of the same person based on the calculated similarities for the plurality of the face directions.

12. A non-transitory computer-readable medium having stored therein instructions for causing a processing unit to execute a method, the method comprising the steps of:

extracting a facial region including a face after detecting the face pictured in an image;

acquiring identification information for identifying a face associated with the extracted facial region; and performing an integrated processing by determining if a face being tracked and a face pictured in an image to be stored in a predetermined storage period after vanishing from the image are the face of the same person based on the identification information, wherein the integrated processing calculates a similarity between the face being tracked and the stored face image for a plurality of face directions, and determines if the face being tracked and the stored face image are the face of the same person based on the calculated similarities for the plurality of the face directions.

13. An image processing device comprising:

a processing unit; and a non-transitory computer-readable medium coupled to the processing unit storing instructions that, when executed by the processing unit, cause the device to:

extract a facial region including a face, after detecting the face pictured in an image;

acquire identification information for identifying a face associated with the extracted facial region;

perform a first integrated processing by determining if a face being tracked and a face pictured in an image to be stored in a predetermined storage period after vanishing from the image are the face of the same person based on the identification information; and perform a second integrated processing by determining if a face being tracked and a face pictured in an image to be stored in a predetermined storage period after vanishing from the image are the face of the same person based on the identification information in a different manner from that of the first integrated processing, wherein the first integrated processing is performed by determining a threshold value on the basis of a relationship between an estimated area in which the stored face image is predicted to appear and a position of the face being tracked, calculating a similarity between the face being tracked and the stored face image, and determining if the face being tracked and the stored face image are the face of the same person based on the calculated similarity, and the threshold value corresponding to the stored face image used in calculating the similarity, and wherein the second integrated processing is performed by calculating a similarity between the face being tracked and the stored face image for a plurality of face directions, and determining if the face being tracked and the stored face image are the face of the same person based on the calculated similarity for the plurality of the face directions.

14. An image processing device comprising:

a processing unit; and a non-transitory computer-readable medium coupled to the processing unit storing instructions that, when executed by the processing unit, cause the device to:

extract a facial region including a face, after detecting the face pictured in an image;

acquire identification information for identifying a face associated with the extracted facial region;

perform an integrated processing by determining if a face being tracked and a face pictured in an image to be stored in a predetermined storage period after vanishing from the image are the face of the same person based on the identification information;

wherein the integrated processing is performed by determining a threshold value on the basis of a relationship between an estimated area in which the stored face image is predicted to appear and a position of the face being tracked, calculating a similarity between the face being tracked and the stored face image, and determining if the face being tracked and the stored face image are the face of the same person based on the calculated similarity, and the threshold value corresponding to the stored face image used in calculating the similarity.

15. An image processing device comprising:

a processing unit; and a non-transitory computer-readable medium coupled to the processing unit storing instructions that, when executed by the processing unit, cause the device to:

extract a facial region including a face, after detecting the face pictured in an image;

acquire identification information for identifying a face associated with the extracted facial region;

perform an integrated processing by determining if a face being tracked and a face pictured in an image to be stored in a predetermined storage period after vanishing from the image are the face of the same person based on the identification information, wherein the integrated processing is performed by calculating a similarity between the face being tracked and the stored face image for a plurality of face directions, and determining if the face being tracked and the stored face image are the face of the same person based on the calculated similarity for the plurality of the face directions.

* * * * *